United States Patent [19]

Hashimoto et al.

[11] Patent Number: 4,486,078
[45] Date of Patent: Dec. 4, 1984

[54] DRIVING DEVICE FOR A REVOLVER IN A MICROSCOPE

[75] Inventors: Noriyoshi Hashimoto, Yokohama; Kazuaki Saiki, Kawasaki, both of Japan

[73] Assignee: Nippon Kogaku K. K., Tokyo, Japan

[21] Appl. No.: 484,415

[22] Filed: Apr. 12, 1983

[30] Foreign Application Priority Data

Apr. 16, 1982 [JP] Japan .............................. 57-55439[U]

[51] Int. Cl.³ .......................... G02B 7/16; H02P 3/08
[52] U.S. Cl. .................................. 350/520; 350/254; 318/477
[58] Field of Search ............... 350/520, 254, 507, 508; 318/477, 455, 469, 474

[56] References Cited

U.S. PATENT DOCUMENTS

| 4,166,239 | 8/1979 | Nakatani | 318/477 |
| 4,266,855 | 5/1981 | Mohr | 350/254 |
| 4,307,940 | 12/1981 | Hagedorn-Olsen | 350/254 |

FOREIGN PATENT DOCUMENTS 736036  5/1980  U.S.S.R. ............................. 350/254

Primary Examiner—Jon W. Henry
Attorney, Agent, or Firm—Shapiro and Shapiro

[57] ABSTRACT

A microscope provided with a revolver having objective lenses mounted thereon and rotatable to move the objective lenses into an observation optical path comprises means for varying the load torque for rotation of the revolver at the rotated position of the revolver when the objective lenses face a predetermined position in the observation optical path, an electric motor, circuit means for driving the electric motor, means for transmitting the rotation of the electric motor to the revolver, and means for detecting the fluctuation of the load of the electric motor caused by a variation in the rotational torque of the revolver, and means for acting on the circuit means to stop the rotation of the electric motor in response to the detecting means.

8 Claims, 4 Drawing Figures

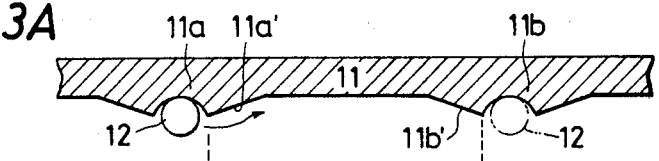
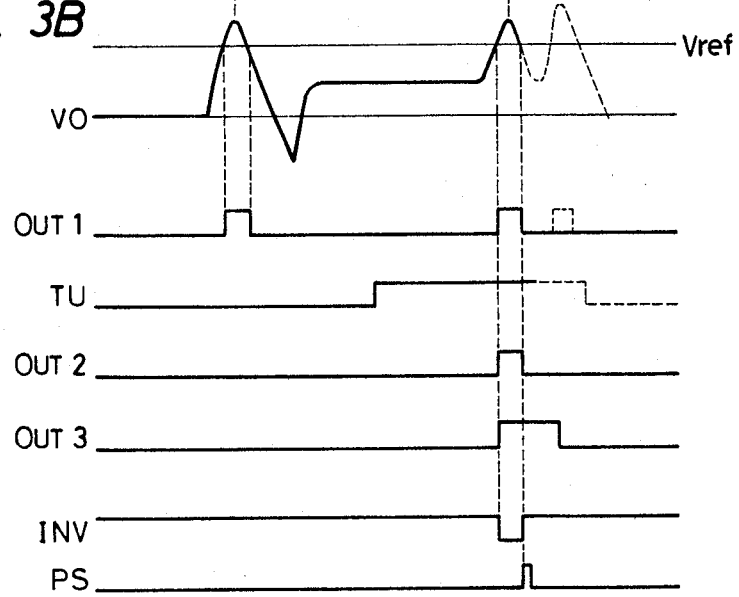

DRIVING DEVICE FOR A REVOLVER IN A MICROSCOPE

BACKGROUND OF THE INVENTION

1. Field of the Invention

This invention relates to a revolver for mounting the objective lenses of a microscope thereon, and in particular to a driving device for rotating the revolver for the interchange of the objective lenses.

2. Description of the Prior Art

Heretofore, in a microscope, a plurality of objective lenses have been mounted on an objective revolver and the magnification of the objective lenses has been changed by manually rotating the objective revolver.

However, the objective revolver normally overlies a sample to be observed and therefore, when the objective revolver is manually operated, minute dust may drop from the hand onto the sample. Particularly, during the observation of a semiconductor wafer or the like having a minute pattern of the order of one micron, even such dust forms a problem and therefore, a microscope in which the rotation of the objective revolver is accomplished manually has not been preferable.

SUMMARY OF THE INVENTION

It is an object of the present invention to provide a microscope in which the rotation of the objective revolver is automatized.

It is another object of the present invention to provide a driving device for electrically rotating the objective revolver and for automatically stopping the revolver at a position whereat one of objective lenses is aligned with respect to the optical axis.

The invention will become fully apparent from the following detailed description thereof taken in conjunction with the accompanying drawings.

BRIEF DESCRIPTION OF THE DRAWINGS

FIG. 3A is a rectilinearly developed view of a part of FIG. 1.

FIG. 3B is a timing chart for illustrating the operation of the embodiment shown in FIG. 2.

DESCRIPTION OF THE PREFERRED EMBODIMENT

Figure 1:
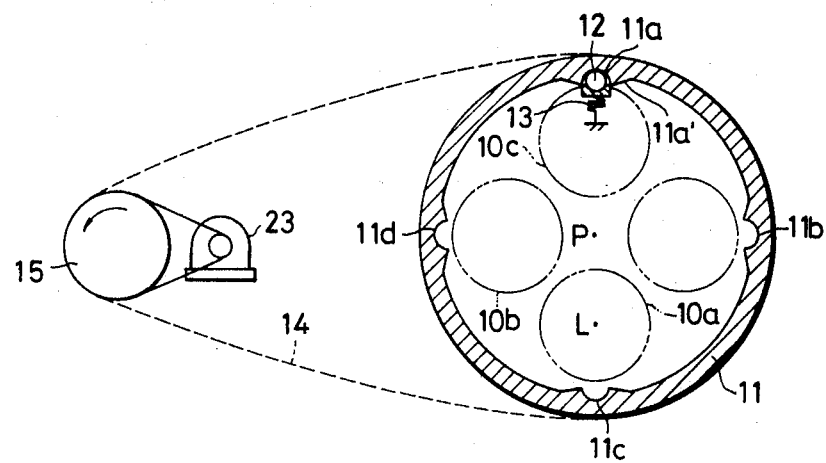
FIG. 1 is a cross-sectional plan view partly showing the objective revolver of a microscope according to an embodiment of the present invention.
Figure 2:
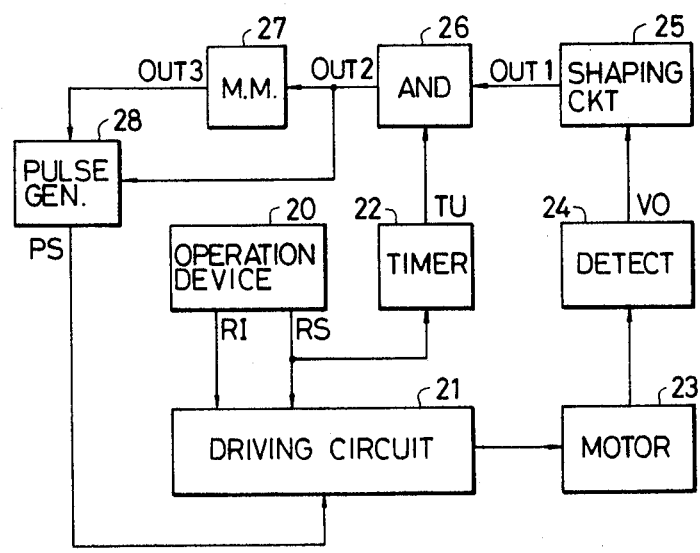
FIG. 2 is a block diagram showing an embodiment of an electric device for driving the motor of FIG. 1.

Referring to FIGS. 1 and 2, there is shown an embodiment of the present invention. In FIG. 1, an objective revolver 11 is supported for rotation about an axis P relative to a fixed portion of the body, not shown, and has four mounts 10a, 10b, 10c and 10d for mounting objective lenses. The inner peripheral surface of the revolver 11 has clicking recesses 11a, 11b, 11c and 11d corresponding to the respective mounts, and a click ball 12 biased by a spring 13 is adapted to be received into these recesses 11a to 11d from the device body. By the click ball 12 being received in the recesses 11a to 11d, objective lenses corresponding to these recesses are aligned with an observation optical axis L. The circumference of each recess protrudes from the inner peripheral surface of the revolver toward the rotational axis P and the click ball 12 is received into the respective recesses beyond the sloping surfaces formed by the protuberances. A belt 14 as a power transmitting means is extended between the outer periphery of the revolver 11 and a pulley 15 rotated by a motor 23.

FIG. 2 shows an electric device for controlling the drive of the motor. An operation device 20 has switches extraneously operable to put out a revolver rotation start signal RS and a revolver rotational direction indicating signal RI. More specifically, it has, for example, a switch for indicating the clockwise rotation of the revolver and a switch for indicating the counter-clockwise rotation of the revolver. Design may be made such that when the switch for indicating the clockwise rotation is closed, the clockwise rotation indicating signal RI is first put out to a predetermined terminal and thereafter the rotation start signal RS is put out, or there may be provided a clockwise rotation indicating signal outputting switch, a counter-clockwise rotation indicating signal outputting switch and a rotation start signal outputting switch. The signals RS and RI from the operation device 20 are applied as inputs to a driving circuit 21 capable of controlling the motor in both directions. The rotation start signal RS is also applied as input to a timer circuit 22. When the signal RS is applied as input to the driving circuit 21, this circuit supplies the motor 23 with a current of a predetermined direction indicated by the signal RI. The load current of the motor 23 is detected by a detecting circuit 24. The detecting circuit 24 produces a voltage output VO variable correspondingly to the variation in the load current. A waveform shaping circuit 25 threshold-processes the output voltage VO of the detecting circuit 24 at a predetermined level and waveform-shapes this output voltage. On the other hand, the timer circuit 22, as will be described later, puts out a time-up signal Tu as early as possible after the lapse of the time necessary for the click ball 12 to ride over the protuberance 11a' around the recess 11a of the revolver to be disengaged from the recess 11a in which the click ball 12 is presently fitted after the rotation start signal RS has been put out. An AND gate 26 causes the output signal 01 of the waveform shaping circuit 25 when the time-up signal Tu is being produced to be applied as input to a monostable multivibrator 27 and a pulse generating circuit 28. The pulse generating circuit 28 makes a stop pulse Ps from the signal OUT2 of the AND gate 26 and the signal OUT3 of the multivibrator 27 and applies it as input to the driving circuit 21. The driving circuit 21 stops the supply of current to the motor 23 in response to the stop pulse Ps.

Such operation will hereinafter be described with reference to FIGS. 3A and 3B.

In FIG. 3A, for convenience of illustration, it is assumed that the click ball 12 moves relative to the revolver 11. First, consider a case where the click ball 12 is received in the recess 11a of the revolver 11. When the operation device 20 is instructed to rotate the revolver 11 in counter-clockwise direction, the driving circuit 21 rotates the motor 23 in the direction therefor. This rotation of the revolver is equivalent to rightward movement of the click ball 12 as viewed in FIG. 3A if it is assumed that the revolver 11 is stationary. When the click ball 12 comes out of engagement with the recess 11a, a great load current flows to the motor 23 due to the increase in resistance resulting from the biasing force of the spring 13 and therefore, the output voltage VO of the detecting circuit 24 is increased. When the click ball has come out of the recess 11a, the load of the motor becomes stable at a relatively small value. When the click ball climbs up the sloping surface 11b' forming the protuberance around the next recess 11b, the load is increased and thus, the output voltage VO of the detecting circuit is increased. When the click ball drops into the recess 11b, the load of the motor is decreased. When the click ball 12 comes out of engagement with the recess 11b, a great load current again flows to the motor and therefore, the output voltage VO of the detecting circuit is increased as indicated by broken line in FIG. 3B. Since the waveform shaping circuit 25 threshold-processes the output voltage VO of the detecting circuit 24 at a predetermined level $V_{ref}$, the output signal OUT1 is produced when the click ball comes out of engagement with the recess 11a, when the click ball climbs up the sloping surface 11b' and when the click ball comes out of the recess 11b. Since the timer circuit 22 puts out a high level time-up signal TU in a sufficient time required for the click ball 12 to come out of the first recess 11a after the motor starts to rotate, the AND gate 26 first puts out the output signal OUT1 which is obtained when the click ball climbs up the sloping surface 11b' of the recess 11b. This signal is a signal OUT2 indicative of the fact that the revolver 11 has been rotated by a predetermined amount. At the moment when the click ball 12 completely climbs up the sloping surface 11b', the value of the output voltage VO of the detecting circuit reaches its peak and therefore, the falling of the signal OUT2 indicates that the click ball 12 is at a certain position in the course of its downward movement after it has completely climbed up the sloping surface 11b'. The monostable multivibrator 27 and the pulse generating circuit 28 prepare the stop pulse PS for stopping the supply of current to the motor upon this falling. That is, the multivibrator 27 puts out a pulse output OUT3 of a predetermined time width in response to the rising of the output signal OUT2 of the AND gate 26. On the other hand, the pulse generating circuit 28 prepares an inverted signal INV of the output signal OUT2 of the AND gate 26 and also prepares the stop pulse PS by the AND of the pulse output OUT3 of a predetermined time width and the rising of the inverted signal INV, and applies it to the driving circuit 21. As a result, the driving circuit 21 cuts off the supply of current to the motor 23. Accordingly, the motor 23 rotates due only to its inertia and the click ball 12 naturally drops into the recess 11b due to the inertial rotation of the motor and the biasing force of the spring13 and becomes stable in its dropped state. As a result, the rotation of the revolver 11 is stopped at a position whereat the optical axis of the objective lens 10b is coincident with the observation optical axis.

The timer circuit 22 terminates the production of the time-up signal TU after the click ball 12 has become stable in the recess and therefore, rotation of the revolver becomes possible when the rotation start signal RS is again produced.

In the above-described embodiment, correspondingly to one rotation indication, the revolver is rotated until the click ball is received in an adjacent recess and therefore, to cause the revolver to make one full rotation, four rotation indications are necessary in any of the case of clockwise rotation and the case of counter-clockwise rotation, but if, for example, detectors putting out different signals for the respective recesses are provided on the revolver and the operation device is provided with the function of designating a magnification of the objective lens corresponding to a particular recess, rotation of the revolver may be controlled such that a desired objective lens is selected by once indicating to the operation device the magnification of an objective lens which it is desired to insert in the observation optical path.

Although a belt is best suited as the rotation transmitting device, the same function can of course be obtained even by using gears or other means.

We claim:

1. A microscope provided with a revolver having objective lenses mounted thereon and rotatable to move the objective lenses into an observation optical path, said microscope comprising:
    (a) means for varying the load torque for rotation of said revolver at the rotated position of said revolver when said objective lenses face a predetermined position in said observation optical path;
    (b) an electric motor;
    (c) circuit means for driving said electric motor;
    (d) means for transmitting the rotation of said electric motor to said revolver;
    (e) means for detecting the fluctuation of the load of said electric motor caused by a variation in the rotational torque of said revolver; and
    (f) means for acting on said circuit means to stop the rotation of said electric motor in response to said detecting means.

2. A microscope according to claim 1, wherein said detecting means converts the magnitude of a current flowing to said electric motor into a voltage and produces a detection signal when the variation in said voltage exceeds a predetermined value.

3. A microscope provided with a revolver having objective lenses mounted thereon and rotatable to move the objective lenses into an observation optical path, said microscope comprising:
    (a) first means for causing a biasing force opposed to the rotation of said revolver to act when said objective lenses are at a predetermined position in said observation optical path;
    (b) second means for causing a biasing force opposed to the rotation of said revolver to act immediately before said objective lenses are brought to said predetermined position by rotation of said revolver;
    (c) electric driving means for rotating said revolver;
    (d) means for producing an output signal responsive to any variation in torque for the rotation of said revolver; and
    (e) means including means for discriminating from said output signal a first signal element corresponding to said variation in torque caused by the action of the biasing force of said first means and a second signal element corresponding to said variation in torque caused by the action of the biasing force of said second means, said means acting on said electric driving means to stop the rotation of said revolver in response to said second signal element of said output signal.

4. A microscope according to claim 3, further comprising means for producing a start signal for causing said electric driving means to start to rotate said revolver and wherein said discriminating means includes means for counting a predetermined time from the production of said start signal until at least said objective lenses leave said predetermined position.

5. A microscope according to claim 4, wherein said discriminating means includes gate means for transmitting to said electric driving means said output signal produced after the lapse of said predetermined time.

6. A microscope according to claim 3, wherein said first means includes click stop means provided between said revolver and a main body supporting said revolver, said click stop means includes a concave surface and contact means which contact each other when said objective lenses are at said predetermined position, and said second means includes a convex surface formed around said concave surface.

7. A microscope according to claim 3, wherein said electric driving means includes an electric motor and circuit means for supplying a current to said motor, and said output signal producing means is responsive to any variation in magnitude of the current flowing to said motor.

8. A microscope according to claim 7, wherein said output signal producing means converts the magnitude of said current into a voltage and produces said output signal when the variation in said voltage exceeds a predetermined value.

* * * * *